(12) United States Patent
Wang et al.

(10) Patent No.: US 6,441,994 B1
(45) Date of Patent: Aug. 27, 2002

(54) HIGH FREQUENCY RESPONSE WRITER WITH RECESSED SHARED POLE AND VERTICAL COILS

(75) Inventors: Feng Wang, Lakeville; Richard P. Larson, Brooklyn Park; Yuming Zhou, Lakeville; Patrick J. Ryan, St. Paul, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/566,560

(22) Filed: May 8, 2000

Related U.S. Application Data

(60) Provisional application No. 60/144,269, filed on Jul. 15, 1999.

(51) Int. Cl.[7] .................................................. G11B 5/17
(52) U.S. Cl. .................................................... 360/123
(58) Field of Search ................................ 360/123, 126, 360/125

(56) References Cited

U.S. PATENT DOCUMENTS

| | | | | |
|---|---|---|---|---|
| 5,311,386 A | * | 5/1994 | Mallary | 360/123 |
| 5,452,168 A | * | 9/1995 | Nepela et al. | 360/123 |
| 5,734,534 A | * | 3/1998 | Yamamoto et al. | 360/123 |
| 6,163,435 A | * | 12/2000 | Gaud et al. | 360/123 |
| 6,195,232 B1 | * | 2/2001 | Cohen | 360/123 |
| 6,236,538 B1 | * | 5/2001 | Yamada et al. | 360/126 |
| 6,275,354 B1 | * | 8/2001 | Huai et al. | 360/123 |
| 6,335,846 B1 | * | 1/2002 | Gaud et al. | 360/123 |

* cited by examiner

*Primary Examiner*—Allen Cao
(74) *Attorney, Agent, or Firm*—Kinney & Lange, P.A.

(57) ABSTRACT

A magnetic recording head has a top pole, a write gap layer, a shared pole, and conductive coils. The shared pole has an air bearing surface, a top surface substantially normal to the air bearing surface, and a recess in the top surface extending across the top surface parallel to the air bearing surface. The shared pole is separated from the top pole at the air bearing surface by the write gap layer, and directly contacts the top pole at a region of the writer distal from the air bearing surface. Wrapped around the top pole are the conductive coils, a portion of which is positioned in the recess of the shared pole between the top pole and the shared pole.

10 Claims, 3 Drawing Sheets

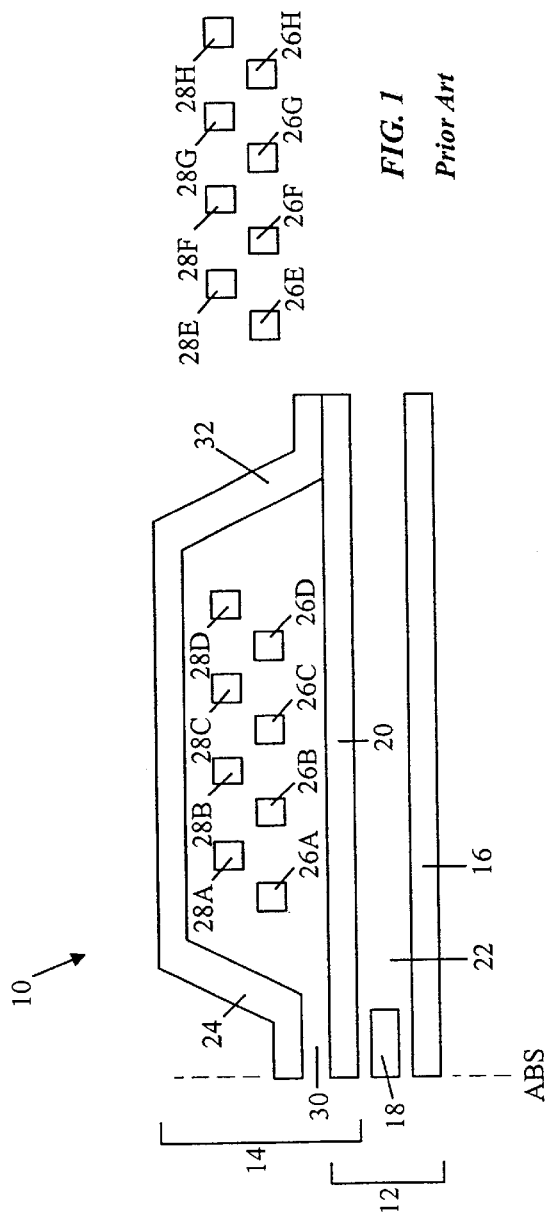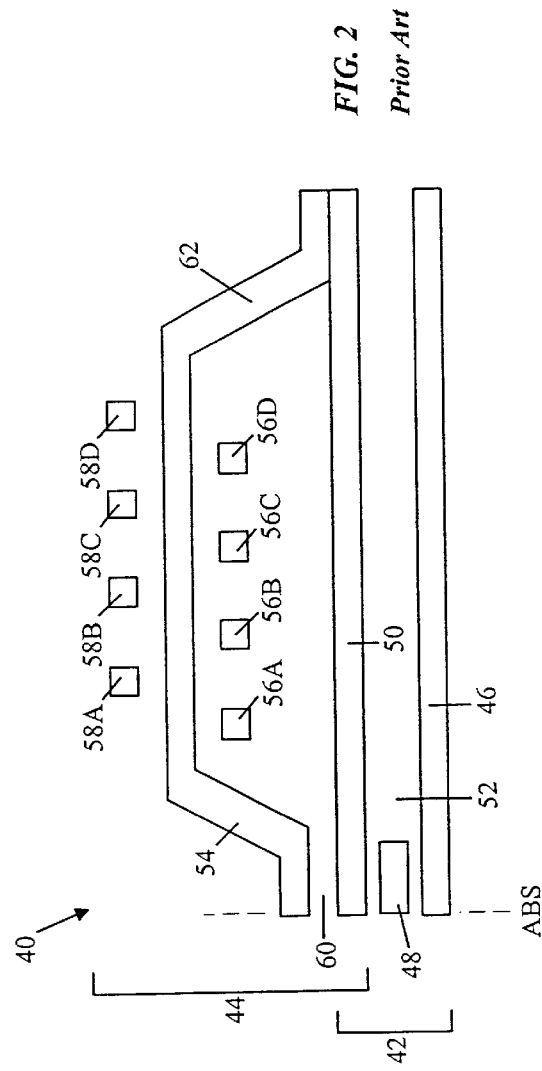

HIGH FREQUENCY RESPONSE WRITER WITH RECESSED SHARED POLE AND VERTICAL COILS

CROSS-REFERENCE TO RELATED APPLICATION(S)

This Application claims priority from provisional application No. 60/144,269, filed Jul. 15, 1999 for "High Frequency Response Writer With Recessed SP and Torroidal Coils" of Feng Wang, Richard P. Larson, Yuming Zhou, and Patrick Ryan.

BACKGROUND OF THE INVENTION

The present invention relates generally to the field of electronic data storage and retrieval. In particular, the present invention relates to a magnetic recording head having a recessed shared pole and vertical coils.

A magnetic recording head generally consists of two portions, a writer portion for storing magnetically-encoded information on a magnetic disc and a reader portion for retrieving that magnetically-encoded information from the disc. The reader portion typically consists of a bottom shield, a top shield, and a magnetoresistive (MR) sensor positioned between the bottom and top shields. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary.

The writer portion typically consists of a top and a bottom pole, which are separated from each other at an air bearing surface of the writer by a gap layer, and which are connected to each other at a region distal from the air bearing surface by a back via. Positioned between the top and bottom poles are one or more layers of conductive coils encapsulated by insulating layers, which typically form a hill which is thinner near the air bearing surface than it is toward the center of the writer. The shape of the top pole, which is formed on this hill, typically follows the contour of the hill. The air bearing surface is the surface of the recording head immediately adjacent the magnetic medium or disc. The writer portion and the reader portion are often arranged in a merged configuration in which a shared pole serves as both the top shield in the reader portion and the bottom pole in the writer portion.

To write data to the magnetic media, an electrical current is caused to flow through the conductive coils to thereby induce a magnetic field across the write gap between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole at the air bearing surface.

A common configuration for the conductive coils within the writer is a "pancake" coil configuration in which the coils wrap around the back via in a plane substantially normal to the air bearing surface. Because the pancake coils extend relatively far into the writer and away from the air bearing surface, the pancake coils are necessarily long. Additionally, the pancake coils are highly inefficient since the pancake coils wrap around only a small portion of the top pole (that is, only the back via). Accordingly, it is necessary to have greater number of coil turns around the back via to overcome this inefficiency of the pancake coils. Third, the frequency response of the writer is low due to the large number of coil turns required and the overall length thereof, as the greater length of the coils requires a greater amount of time to reverse the direction of current through the coils.

One solution to the pancake coil configuration of the conductive coils is the vertical (or torroidal) coil configuration in which the coils are wrapped vertically around the top pole. In this configuration, a lower layer of coils is provided between the top and the bottom poles and a upper layer of coils is provided above the top pole. The upper and lower layers of coils are then connected to each other using conventional methods to form a single vertical coil.

The vertical coil configuration offers improved efficiency over the pancake coil configuration, in that a greater percentage of the top pole is wrapped by the coils, and thus requires fewer number of coil turns around the top pole. Additionally, the configuration allows for a shorter length of coil per coil turn. The shorter overall length of the vertical coil configuration thus offers improved frequency response over the pancake coil configuration.

Nonetheless, both of these prior art configurations have a distinct limitation. In both configurations, the top pole is formed over a mound of coils resulting in the top pole having a "bump" shape. As described above, the track width of the written data is defined by the width of the top pole at the air bearing surface. In both of these configurations, however, the portion of the top pole adjacent the air bearing surface is sloped. It is therefore difficult to precisely control the width of the top pole at the air bearing surface, particularly as the width necessarily becomes smaller to allow for greater data storage densities.

Accordingly, there is a need for a write head which incorporates the advantages of the vertical coil configuration of the writer with greater tolerance control of the width of the top pole at the ABS.

BRIEF SUMMARY OF THE INVENTION

A magnetic recording head has a top pole, a write gap layer, a shared pole, and conductive coils. The shared pole has an air bearing surface, a top surface substantially normal to the air bearing surface, and a recess in the top surface extending across the top surface normal to the air bearing surface. The shared pole is separated from the top pole at the air bearing surface by the write gap layer, and directly contacts the top pole at a region of the writer distal from the air bearing surface. Wrapped around the top pole are the conductive coils, a portion of which is positioned in the recess of the shared pole between the top pole and the shared pole.

BRIEF DESCRIPTION OF THE DRAWINGS

FIG. 1 is a cross-sectional view of a prior art magnetic recording head having a writer portion with pancake coils.

FIG. 2 is a cross-sectional view of a prior art magnetic recording head having a writer portion with vertical coils.

DETAILED DESCRIPTION

Figure 3:
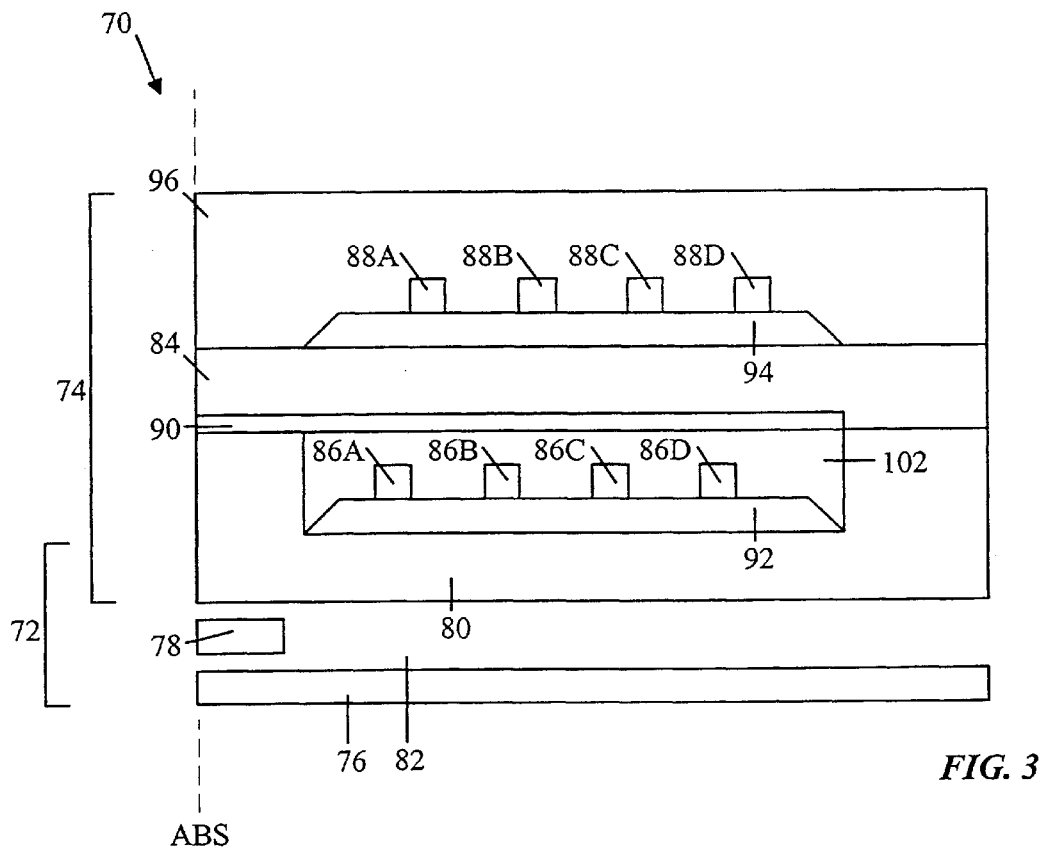
FIG. 3 is a cross-sectional view of a magnetic recording head in accord with the present invention.

FIG. 1 is a cross-sectional view of prior art magnetic recording head 10 having reader portion 12 and writer portion 14. Reader portion 12 includes bottom shield 16, read element 18, top shield 20 and read gap 22. Read element 18 is positioned between bottom shield 16 and top shield 20 adjacent air bearing surface (ABS) of magnetic recording head 10. Read gap 22 serves to isolate read element 18 from both top and bottom shields 20 and 16.

Writer portion 14 includes bottom pole 20, top pole 24, first pancake coil layer 26 (shown in cross-section as inner coils 26A–26D and outer coils 26E–26H), second pancake coil layer 28 (shown in cross-section as inner coils 28A–28D and outer coils 28E–28H), and write gap 30. As shown in FIG. 1, bottom pole 20 also serves as top shield 20, and is commonly referred to as shared pole 20.

Inner coils 26A–26D and 28A–28D are located between top pole 24 and shared pole 20. Shared pole 20 is relatively planar in shape, while top pole 24 is bump-shaped, where the bump is defined by the layering of the inner coils between top pole 24 and shared pole 20. At the ABS of magnetic recording head 10, top pole 24 is separated from shared pole 20 by write gap 30. At a region of magnetic recording head 10 distal from the ABS, top pole 24 is in direct contact with shared pole 20 at back via 32. Top pole 24 is tapered at the ABS to define a track width of the data written to the magnetic media.

First pancake coil layer 26 is one continuous coil which wraps around back via 32 in a plane substantially normal to both the ABS of magnetic recording head 10 and to the plane of the paper of FIG. 1. In one embodiment of first pancake coil layer 26, the coils may be wrapped in the following order: 26D to 26E to 26C to 26F to 26B to 26G to 26A to 26H. Similarly, second pancake coil layer 28 is a single continuous coil which wraps around back via 32 in a plane substantially normal to both the ABS of magnetic recording head 10 and to the plane of the paper of FIG. 1. In one embodiment of second pancake coil layer 28, the coils maybe wrapped in the following order: 28D to 28E to 28C to 28F to 28B to 28G to 28A to 28H. To form a single coil, rather than two coils, coil 26D may be connected to coil 28D. In this configuration of the coils, coils 26H and 28H serve as contacts to which current may be provided to the single continuous coil. Each of the individual coils 26A–26H and 28A–28H are separated from one another and from top and shared poles 24 and 20 by an insulating material.

To write magnetically-encoded data to the magnetic media, an electrical current is caused to flow through coil layers 26 and 28, thereby inducing a magnetic field across write gap 30 between top and shared poles 24 and 20. By reversing the polarity of the current through coil layers 26 and 28, the polarity of the data stored to the magnetic media is reversed.

There are several problems associated with the pancake coil design of magnetic recording head 10. First, coils 26 and 28 are necessarily long since coils 26 and 28 extend relatively far into head 10 and away from the ABS. Second, coils 26 and 28 are highly inefficient since they wrap around only a small fraction of top or bottom pole 24 or 20 (specifically, only back via 32 is wrapped by coils 26 and 28). Due to this inefficiency of coils 26 and 28, it is necessary to have a greater number of coil turns around back via 32 to increase the field strength at the write gap, which thereby increases the overall length of coils 26 and 28. Third, the frequency response of writer portion 14 is low due to the large amount of time required to reverse the direction of current through coils 26 and 28. This reversal time is directly related to the length of coils 26 and 28.

FIG. 2 is a cross-sectional view of prior art magnetic recording head 40 having reader portion 42 and writer portion 44. Reader portion 42 includes bottom shield 46, read element 48, top shield 50 and read gap 52. Read element 48 is positioned between bottom shield 46 and top shield 50 adjacent the ABS of magnetic recording head 40. Read gap 52 serves to isolate read element 48 from both top and bottom shields 50 and 46.

Writer portion 44 includes bottom pole 50, top pole 54, bottom coil layer 56 (shown in cross-section as coils 56A–56D), top coil layer 58 (shown in cross-section as coils 58A–58D), and write gap 70. As shown in FIG. 2, bottom pole 50 also serves as top shield 50, and is commonly referred to as shared pole 50.

Bottom coil layer 56 is positioned between top pole 54 and shared pole 50, while top coil layer 58 is positioned on a side of top pole 54 opposite bottom coil layer 56. Shared pole 50 is relatively planar in shape, while top pole 54 is bump-shaped, the bump being defined by lower coils 56 between top pole 54 and shared pole 50. At the ABS of magnetic recording head 40, top pole 54 is separated from shared pole 50 by write gap 60. At a region of magnetic recording head 40 distal from the ABS, top pole 54 is in direct contact with shared pole 50 at back via 62. Top pole 54 is tapered at the ABS to define a track width of the data written to the magnetic media.

Bottom coil layer 56 and top coil layer 58 are joined together to form one continuous vertical coil which wraps around top pole 54 in a plane substantially normal to the plane of the paper of FIG. 2. In one embodiment of bottom and top coil layers 56 and 58, the vertical coil is wrapped in the following order: 56A to 58A to 56B to 58B to 56C to 58C to 56D to 58D, wherein coils 56A and 56D serve as contacts to which current may be provided through the vertical coil. Each of the individual coils 56A–56D and 58A–58D are separated from one another and from the top and shared poles 54 and 50 by an insulating material.

To write to the magnetic media, an electrical current is caused to flow through coil layers 56 and 58, thereby inducing a magnetic field across write gap 60 between top and shared poles 54 and 50. By reversing the polarity of the current through coil layers 56 and 58, the polarity of the data stored to the magnetic media is reversed.

Prior art magnetic recording head 40 having vertical coils offers several advantages over prior art magnetic recording head 10 having pancake coils. In particular, vertical coils 56 and 58 are more efficient than pancake coils 26 and 28 in that the portion of top pole 54 wrapped by vertical coils 56 and 58 is substantially greater than the portion of top pole 24 wrapped by pancake coils 26 and 28. This greater efficiency allows for fewer coil turns around the poles to generate the necessary field strength at the write gap, which in turn allows for an increased frequency response of writer portion 44 over writer portion 14.

Nonetheless, both prior art writer 10 with pancake coils and prior art writer 40 with vertical coils have a distinct limitation. In both writer 10 and writer 40, respective top pole 24 or 54 is formed over a mound of coils which results in top poles 24 and 54 having a bump shape. As described above, the track width of the written data is defined by the width of top pole at the ABS. However, with top poles 24 and 54 both being sloped near the ABS, it is difficult to control their width at the ABS of respective magnetic recording heads 10 and 40. To allow for the continuing increases in data storage densities, better control of this critical dimension is necessary.

Figure 4:
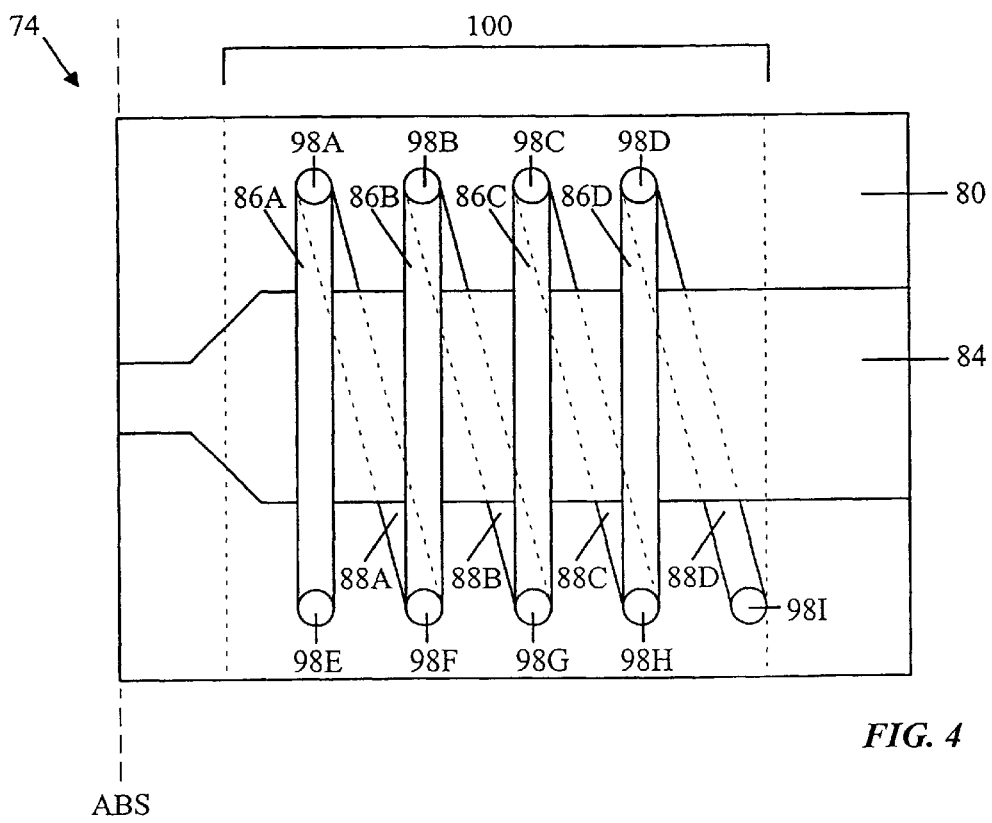
FIG. 4 is a top view of a writer portion of the magnetic recording head of FIG. 3.

FIG. 3 is a cross-sectional view of magnetic recording head 70 in accord with the present invention and having reader portion 72 and writer portion 74. FIG. 4 is a top view of writer portion 74 of magnetic recording head 70. Reader portion 72 includes bottom shield 76, read element 78, top shield 80 and read gap 82. Read element 78 is positioned between bottom shield 76 and top shield 80 adjacent the ABS of magnetic recording head 70. Read gap 82 serves to isolate read element 78 from both top and bottom shields 80 and 76.

Writer portion 74 includes recessed bottom pole 80, top pole 84, bottom coil layer 86 (shown in cross-section as coils 86A–86D), top coil layer 88 (shown in cross-section as coils 88A–88D), write gap 90, bottom photoresist layer 92, top photoresist layer 94, overcoat 96, and bottom insulator 102. As shown in FIG. 3, recessed bottom pole 80 also serves as top shield 80, and is commonly referred to as recessed shared pole 80. As shown in FIG. 4, recessed shared pole 80 has recess 100, which is filled with bottom photoresist layer 92, bottom coil layer 86, and bottom insulator 102.

Bottom coil layer 86 is positioned between top pole 84 and recessed shared pole 80 in recess 100 of shared pole 80. Bottom coil layer 86 is positioned on bottom photoresist layer 92, which is positioned on recessed shared pole 80. Bottom insulator 102 covers bottom coils layer 86 and bottom photoresist layer 92. Top coil layer 88 is positioned on a side of top pole 84 opposite bottom coil layer 86. Top coil layer 88 is positioned on top photoresist layer 94, which is positioned on top pole 84. Top pole 84, top photoresist layer 94, and top coil layer 88 are covered by overcoat 96.

Recess 100 runs substantially parallel to the ABS of magnetic recording head 70. A back region of recessed shared pole 80, which is distal from the ABS, is in direct contact with top pole 84. An air bearing region of recessed shared pole 80, which is adjacent the ABS, is separated from top pole 84 by relatively thin write gap 90.

As shown in FIG. 4, top pole 84 is tapered near the ABS to define a track width of the data written to the magnetic media. By positioning bottom coil layer 86 in recess 100, it is possible for top pole 84 to be relatively planar in shape. The planar shape of top pole 84 allows for greater control over the width of top pole 84 at the ABS. Additionally, the planar shape of top pole 84 allows for greater control of the track width of the data written to the magnetic media.

Bottom coil layer 86 and top coil layer 88 are joined together to form one continuous vertical coil which wraps around top pole 84 in a plane substantially normal to the plane of the paper of FIG. 3. In one embodiment of bottom and top coil layers 86 and 88, the vertical coil is wrapped in the following order: 86A to 88A to 86B to 88B to 86C to 88C to 86D to 88D. Bottom and top coils are connected in this embodiment via connections 98A–98I as follows: coil 86A is connected to coil 88A via connection 98A, coil 88A is connected to 86B via connection 98F, coil 86B is connected to 88B via connection 98B, coil 88B is connected to coil 86C via connection 98G, coil 86C is connected to coil 88C via connection 98C, coil 88C is connected to coil 86D via connection 98H, and coil 86D is connected to 88D via connection 98D. In this embodiment, connections 98E and 98I serve as contacts to which current may be provided through the vertical coil.

To write to the magnetic media, an electrical current is caused to flow through bottom and top coil layers 86 and 88, thereby inducing a magnetic field across write gap 90 between top and recessed shared poles 84 and 80. By reversing the polarity of the current through coil layers 86 and 88, the polarity of the data stored to the magnetic media is reversed.

Magnetic recording head 70 in accord with the present invention offers several advantages over prior art recording heads 10 and 40. In particular, recording head 70 offers each of the advantages of prior art recording head 40 having vertical coils over prior art recording head 10 having pancake coils, namely increased frequency response due to decreased coil length and increased coil efficiency. Additionally, because lower coils 86 are positioned within recess 100, top pole 84 need not be bump-shaped. Rather, the top pole may be substantially planar, which allows for substantially greater control over the width of the top pole at the ABS since current shaping methods, such as photolithography, are much more precise on a planar surface than on a sloping surface.

It will be appreciated by those skilled in the art that FIGS. 1–4 are simplified versions of magnetic recording heads, and that numerous layers are employed in the formation of various aspects of the heads.

Figure 5A:
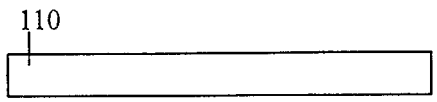
FIGS. 5A–5J are cross-sectional views illustrating one method of forming the magnetic recording head of FIG. 3.
Figure 5B:
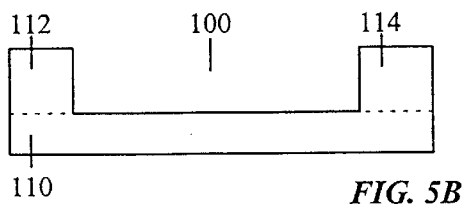

FIGS. 5A–5J illustrate one method of forming magnetic recording head 70 of the present invention. FIGS 5A and 5B illustrate one method by which recessed shared pole 80 may be formed. First, planar first layer 110 is deposited. Next, an interrupted second layer is deposited on first layer 110. As shown in FIG. 5B, the second layer has air bearing portion 112, back portion 114, and recess 100 positioned between air bearing portion 112 and back portion 114. Recessed shared pole 80 is thus formed of first layer 110, air bearing portion 112 and back portion 114.

Figure 5C:
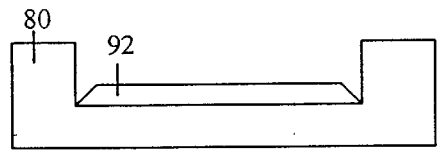
Figure 5D:
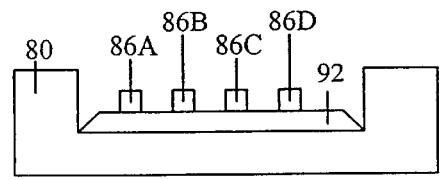
Figure 5E:
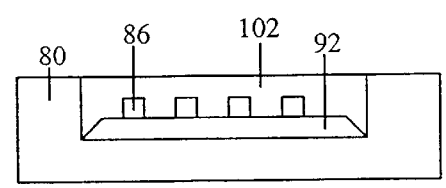
Figure 5F:
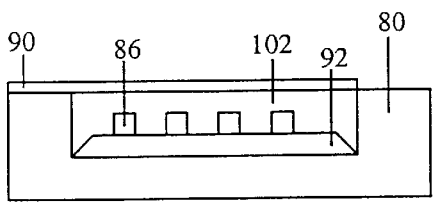
Figure 5G:
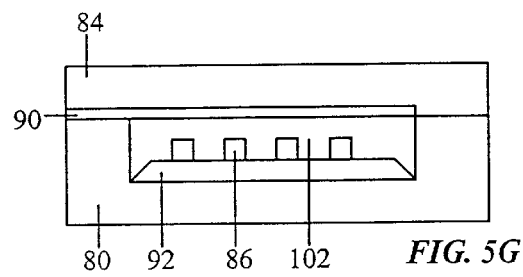
Figure 5H:
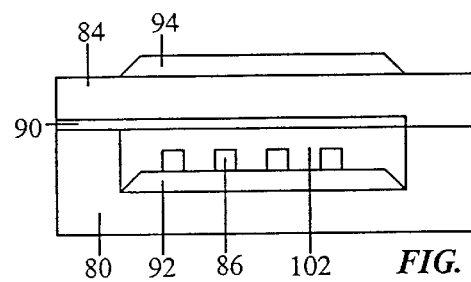
Figure 5I:
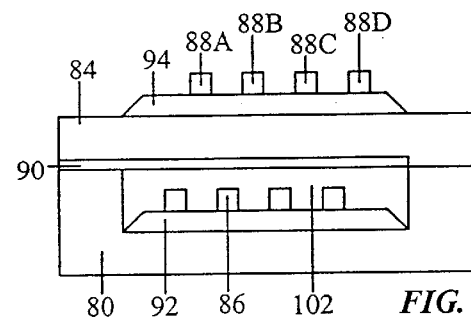
Figure 5J:
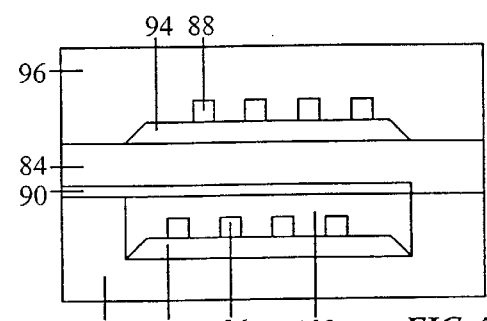

Second, as shown in FIG. 5C, bottom photo-resist layer 92 is formed in recess 100 on shared pole 80. Third, as shown in FIG. 5D, bottom conductive coil layer is formed on bottom photo-resist layer 92. Fourth, as shown in FIG. 5E, bottom insulator 102 is formed over bottom conductive coils 86 and exposed regions of both bottom photo-resist layer 92 and recess 100 of shared pole 80. Bottom insulator 102 fills recess 100. A top surface of magnetic recording head 70 may then be planarized so that atop surface of insulating layer 102 lies in the same plane as a top surface of shared pole 80. Fifth, as shown in FIG. 5F, gap layer 90 is formed over air bearing portion 112 of shared pole 80 and over insulator 102. Sixth, as shown in FIG. 5G, top pole 84 is formed on gap layer 90 and back portion 114 of shared pole 80. Seventh, as shown in FIG. 5H, top photo-resist layer 94 is deposited on a central portion of top pole 84. Eighth, as shown in FIG. 5I, top conductive coil layer 88 is formed on top photo-resist layer 94. Ninth, as shown in FIG. 5J, overcoat layer 96 is formed over top conductive coil layer 88 and exposed regions of both top photo-resist layer 94 and top pole 84. Tenth, top conductive coils 88 are connected to bottom conductive coil layer 86. The order of the ninth and tenth steps may be reversed.

It will be appreciated by those skilled in the art that the method illustrated in FIGS. 5A–5J is simplified, and that the actual formation of magnetic recording head 70 would require additional processing steps. Those skilled in the art will also recognize that there are numerous prior art techniques available for forming a magnetic recording head in accord with the present invention.

Although the present invention has been described with reference to preferred embodiments, workers skilled in the art will recognize that changes may be made in form and detail without departing from the spirit and scope of the invention.

What is claimed is:

1. A magnetic recording head having an air bearing surface and comprising:
   a writer having a top pole, a shared pole, and conductive vertical coils, wherein the vertical coils wrap around the top pole such that a lower portion of the vertical coils extend between the top pole and the shared pole; and
   a recess in a top surface of the shared pole for receiving the lower portion of the vertical coils.

2. The magnetic recording head of claim 1 wherein the recess is substantially parallel to the air bearing surface.

3. The magnetic recording head of claim 1 wherein the top pole is substantially planar.

4. A magnetic recording head comprising:
   a top pole;
   a write gap layer;
   a shared pole having an air bearing surface, a top surface substantially normal to the air bearing surface, and a recess in the top surface extending across the top surface parallel to the air bearing surface, wherein the shared pole is separated from the top pole at the air bearing surface by the write gap layer, and wherein the shared pole directly contacts the top pole at a region of the writer distal from the air bearing surface; and
   conductive coils which wrap around the top pole with a lower portion of the coils extending between the top pole and the shared pole such that the lower portion of the coils is positioned in the recess in the shared pole.

5. The magnetic recording head of claim 4 wherein the top pole is substantially planar.

6. A method for forming a magnetic recording head, the method comprising:
   forming a recessed shared pole having an air bearing portion, a back portion and a recessed portion positioned between the air bearing portion and the back portion, a thickness of the air bearing portion and the back portion each being greater than a thickness of the recessed portion;
   forming a first photo-resist layer on the recessed portion of the shared pole;
   forming a first conductive coil layer on the first photo-resist layer;
   forming an insulating layer over the first conductive coil layer and exposed regions of both the first photo-resist layer and the recessed portion of the shared pole, a combined thickness of the insulating layer and the recessed portion of the shared pole being substantially equal to the thickness of the air bearing portion of the shared pole;
   forming a gap layer on both the air bearing portion of the shared pole and the insulating layer;
   forming a top pole on the gap layer and the back portion of the shared pole
   forming a second photo-resist layer on a central portion of the top pole;
   forming a second conductive coil layer on the second photo-resist layer;
   forming an overcoat layer over the second conductive coil layer and exposed regions of both the second photo-resist layer and the top pole; and
   connecting the first conductive coil layer to the second conductive coil layer.

7. The method of claim 6 wherein the step of forming a recessed shared pole comprises:
   forming a first layer having an air bearing surface and a back surface opposite the air bearing surface; and
   forming an interrupted second layer on the first layer, the second layer having a first portion adjacent the air bearing surface, a second portion adjacent the back surface, and a gap positioned between the first portion and the second portion, the gap forming a recess in the recessed shared pole.

8. The method of claim 7 wherein the recess is substantially parallel to the air bearing surface.

9. The method of claim 6 wherein the step of forming a recessed shared pole comprises:
   depositing a substantially planar shared pole layer having an air bearing surface and a top surface substantially normal to the air bearing surface; and
   selectively removing material from the top surface of the planar shared pole layer to form a recess in the top surface.

10. The method of claim 9 wherein the recess is substantially parallel to the air bearing surface.

* * * * *